UNITED STATES PATENT OFFICE.

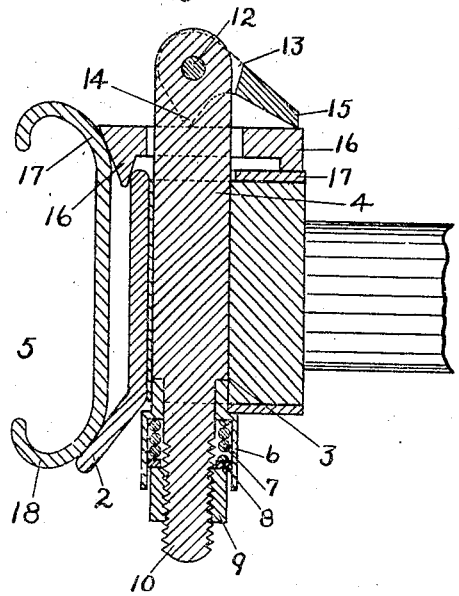
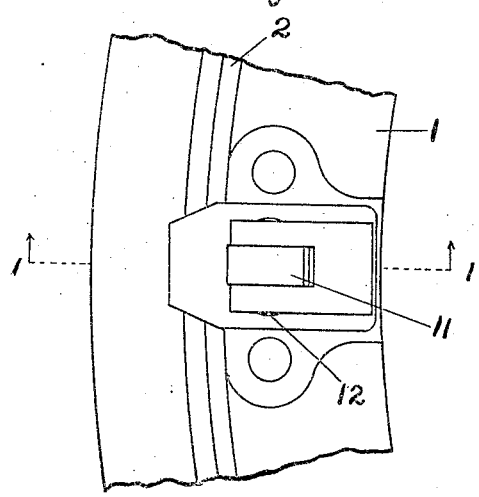

FRANK A. CHAMBERS, OF MINNEAPOLIS, MINNESOTA, ASSIGNOR OF ONE-HALF TO ROBERT BEIER AND I. L. LANDIS, JOINTLY, BOTH OF ST. PAUL, MINNESOTA.

RIM-LOCK FOR DEMOUNTABLE RIMS.

1,285,937.     Specification of Letters Patent.     Patented Nov. 26, 1918.

Application filed February 18, 1918. Serial No. 217,990.

*To all whom it may concern:*

Be it known that I, FRANK A. CHAMBERS, a citizen of the United States, and a resident of Minneapolis, in the county of Hennepin and State of Minnesota, have invented certain new and useful Improvements in Rim-Locks for Demountable Rims, of which the following is a specification.

One object of my invention is to provide, in a rim lock, improved means for quickly unlocking the rim lug.

Another object of my invention is to provide, in a rim lock, a resilient means for holding the locking device normally that may be brought to a rigid clamp when the locking device is in its locked position.

With these and incidental objects in view the invention consists of certain novel features of construction and combination of parts, the essential elements of which are hereinafter described with reference to the drawing which accompanies and forms a part of this specification.

In the drawing Figure 1 is a section taken on the line 1—1, Fig. 2. Fig. 2 is a side view of a portion of an automobile wheel felly and rim having my device applied thereto.

As shown in the drawing, the felly 1, which carries thereon a flanged rim 2 of well known type, has an aperture 3 therein through which passes a bolt 4.

The bolt 4 has a shoulder at 5 to receive the socket 6 carrying a spring 7 and retaining washer 8, so the spring may be compressed by screwing up the nut 9 on the threaded portion 10 of the bolt 4.

The opposite end of the stud is straddle-milled so as to provide a lug 11 to which is hinged at 12 a bell crank 13. One end of the bell crank is fashioned into a cam 14 and the other into a stop 15.

Positioned on the felly with the end 16 resting on a plate 17, is a lug, the opposite end 18 of which is adapted to support the side 17 of the tire rim on the rim 2, the opposite side of the tire rim 18 being supported by the flanged portion of the rim 2.

It is evident from the drawing that if the bell crank is turned to the position shown in Fig. 1, the cam 14 will press downwardly on the lug, forcing the nose 16 in between the tire rim and the flanged rim, and that a series of such locking devices would form supporting points about a tire rim as do the lugs now used in rims of this type.

It is also evident that as the cam point 14 passes the center line of the hinge pin 12, it will be locked in position and that the centrifugal force set up by the revolutions of the wheel in driving will tend to press the end 15 against the lock 16 rather than to loosen the lock.

To loosen the lock it is only necessary to insert a screw driver or other tool under the end 15 and pry upwardly, when the lock may be easily withdrawn from its position between the two rims, and with all of the locks so loosened the rim may be removed and another rim substituted, as is ordinarily done.

In adjusting the rim lock to a wheel I prefer to position the lock in its locked position, as shown in Fig. 1, and then draw the nut 9 up tight so that all of the convolutions of the spring 7 will be resting tightly against each other so that the holding power of the lock will not depend, in any event, upon the resiliency of the spring, the spring action being reserved only for the purpose of holding the bolt in proper position when the lock itself is swung to its unlocked position.

While I have described my invention and illustrated it in one particular design, I do not wish it understood that I limit myself to this construction, as it is evident that the application of the invention may be varied in many ways within the scope of the following claims:

1. In a rim lock the combination, with a bolt, of a bell crank hinged to one end thereof, one of the ends of said bell crank being formed into a cam, the other end of said bell crank being formed into a stop, a lug for co-operation with said cam end and said bolt, a spring receiving socket carried by the other end of said bolt and having a spring therein, and means on said bolt for compressing said spring when said stud is fixed.

2. In a rim lock the combination of a bolt, means on said stud for shouldering against a felly on which said lock is positioned, a bell crank eccentric locking member hinged on the other end of said bolt, one of the ends of said bell crank forming a pressure point, the other end forming a locking point, said locking point, when in a locked position, being positioned inwardly of the hinged connection between said bell crank and said bolt and a compressible spring carried by said bolt and adapted to take up end play of said bolt when the lock is in an unlocked position.

3. In a rim lock the combination of a bolt for coöperation with a wheel felly and a bell crank eccentric locking member hinged on one end of said bolt, one of the ends of said bell crank forming a pressure point which passes the line of pressure between said bolt and said felly when the device is locked.

4. In a rim lock the combination of a bolt for coöperation with a wheel felly and a bell crank eccentric locking member hinged on one end of said bolt, one of the ends of said bell crank forming a pressure point which passes the line of pressure between said bolt and said felly when the device is locked, the other end of said bell crank forming a locking point, said locking point when in a locked position being positioned inwardly of the hinged connection between said bell crank and said bolt.

FRANK A. CHAMBERS.